United States Patent
Doi et al.

(10) Patent No.: US 10,312,023 B2
(45) Date of Patent: Jun. 4, 2019

(54) MULTILAYER CERAMIC CAPACITOR AND METHOD FOR PRODUCING THE SAME

(71) Applicant: Murata Manufacturing Co., Ltd., Nagaokakyo-shi, Kyoto-fu (JP)

(72) Inventors: Akitaka Doi, Nagaokakyo (JP); Shinichi Yamaguchi, Nagaokakyo (JP); Shoichiro Suzuki, Nagaokakyo (JP)

(73) Assignee: MURATA MANUFACTURING CO., LTD., Nagaokakyo-shi, Kyoto-fu (JP)

( * ) Notice: Subject to any disclaimer, the term of this patent is extended or adjusted under 35 U.S.C. 154(b) by 151 days.

(21) Appl. No.: 15/163,885

(22) Filed: May 25, 2016

(65) Prior Publication Data

US 2016/0358712 A1    Dec. 8, 2016

(30) Foreign Application Priority Data

Jun. 5, 2015  (JP) ................................. 2015-114877

(51) Int. Cl.

| | |
|---|---|
| *H01G 4/30* | (2006.01) |
| *H01G 4/008* | (2006.01) |
| *H01G 4/248* | (2006.01) |
| *H01G 4/232* | (2006.01) |
| *H01G 11/30* | (2013.01) |

(52) U.S. Cl.
CPC ............... *H01G 4/30* (2013.01); *H01G 4/008* (2013.01); *H01G 4/232* (2013.01)

(58) Field of Classification Search
CPC .......... H01G 4/30; H01G 4/008; H01G 4/232; H01G 4/248; H01G 11/30
USPC ........................... 361/301.4, 321.1, 305, 303
See application file for complete search history.

(56) References Cited

U.S. PATENT DOCUMENTS

| | | | |
|---|---|---|---|
| 8,102,639 B2 | 1/2012 | Kasuya et al. | |
| 2004/0256603 A1 | 12/2004 | Celik et al. | |
| 2005/0152095 A1 | 7/2005 | Nakano et al. | |
| 2008/0055818 A1 | 3/2008 | Celik et al. | |
| 2009/0067117 A1 | 3/2009 | Kasuya et al. | |
| 2010/0128413 A1* | 5/2010 | Takashima | ............ H01G 4/012 361/306.3 |

(Continued)

FOREIGN PATENT DOCUMENTS

| | | |
|---|---|---|
| CN | 1571855 A | 1/2005 |
| CN | 1637972 A | 7/2005 |

(Continued)

*Primary Examiner* — Eric W Thomas
*Assistant Examiner* — Arun Ramaswamy
(74) *Attorney, Agent, or Firm* — Arent Fox LLP

(57) ABSTRACT

A multilayer ceramic capacitor having inner electrodes with a Ni-Metal A alloy, the Metal A being selected from Fe, V, Y, and Cu and dissolved in the Ni to form a solid solution. The percentage of the Metal A with respect to the total amount of Metal A and Ni in near-surface regions located at a depth of 2 nm from a surface of the inner electrode in contact with an adjacent ceramic dielectric layer is 1.4 or more atom %, and XA−YA≥1.0, where XA represents the atomic percentage of Metal A in the near-surface regions and YA represents the atomic percentage of Metal A in mid-thickness regions of the inner electrodes. A method for producing a multilayer ceramic capacitor includes annealing the ceramic multilayer body under specific conditions to thereby increase, in the inner electrodes, the percentage of Metal A in the near-surface regions.

5 Claims, 2 Drawing Sheets

(56) References Cited

U.S. PATENT DOCUMENTS

2015/0155098 A1  6/2015  Yamaguchi et al.

FOREIGN PATENT DOCUMENTS

| CN | 101182201 A | 5/2008 |
| CN | 101930847 A | 12/2010 |
| CN | 103794363 A | 5/2014 |
| JP | H11283667 A | 10/1999 |
| JP | 2009032837 A | 2/2009 |
| JP | 2013098312 A | 5/2013 |
| KR | 20150036428 A | 4/2015 |

* cited by examiner

MULTILAYER CERAMIC CAPACITOR AND METHOD FOR PRODUCING THE SAME

CROSS REFERENCE TO RELATED APPLICATIONS

The present application claims priority to Japanese Patent Application No. 2015-114877, filed Jun. 5, 2015, the entire contents of which are incorporated herein by reference.

BACKGROUND OF THE INVENTION

1. Field of the Invention

The present invention relates to a multilayer ceramic capacitor including ceramic dielectric layers and inner electrodes superimposed with the ceramic dielectric layers therebetween and a method for producing a multilayer ceramic capacitor.

2. Description of the Related Art

Recent progress in electronics technology has required smaller and higher-capacitance multilayer ceramic capacitors. In view of such circumstances, the ceramic dielectric layers constituting a multilayer ceramic capacitor have been made thinner increasingly.

However, if the ceramic dielectric layers are made thinner, the relative intensity of the electric field imposed on each layer increases. This requires an improvement in durability under application of voltage and an improvement in reliability.

An example of a known multilayer ceramic capacitor like that described above is a multilayer ceramic capacitor including: a multilayer body constituted by a stack of ceramic dielectric layers with inner electrodes interposed between adjacent ceramic dielectric layers; and outer electrodes disposed on the outer surface of the multilayer body and electrically connected to the inner electrodes (see Japanese Unexamined Patent Application Publication No. 11-283867). In this document, the inner electrodes of the multilayer ceramic capacitor contain Ni as a main component.

However, the multilayer ceramic capacitor disclosed in this document, which includes the inner electrodes containing Ni as a main component, does not always have a sufficient service life under high-temperature loading. Therefore, the development of a highly-durable multilayer ceramic capacitor having an increased service life under high-temperature loading has been required.

SUMMARY OF THE INVENTION

Accordingly, it is an object of the present invention to provide a multilayer ceramic capacitor that has a sufficient service life under high-temperature loading even if ceramic dielectric layers are made thinner and a method by which such a multilayer ceramic capacitor may be unfailingly produced.

According to a preferred embodiment of the present invention, a multilayer ceramic capacitor is provided. The multilayer ceramic capacitor includes a ceramic multilayer body including a stack of ceramic dielectric layers and inner electrodes arranged in a superimposed manner with the ceramic dielectric layers interposed therebetween; and outer electrodes disposed on an outer surface of the ceramic multilayer body so as to be in electrical communication with the inner electrodes. In the inner electrodes, at least one metal, defined as Metal A, selected from the group consisting of Fe, V, Y, and Cu is dissolved in Ni to form a solid solution, the percentage of Metal A with respect to the total amount of Metal A and Ni in near-surface regions of the inner electrodes is 1.4 or more atom %, each of the near-surface regions being a region at a depth of within 2 nm from a surface in contact with an adjacent one of the ceramic dielectric layers, and the relationship described below is satisfied:

$XA-YA \geq 1.0$ where $XA$ represents the atomic percentage of Metal A in the near-surface regions and $YA$ represents the atomic percentage of Metal A in mid-thickness regions of the inner electrodes.

It is preferable that the multilayer ceramic capacitor be arranged such that, assuming that the inner electrodes have a thickness defined as T, each of the mid-thickness regions is a region that is located 0.2 T or more inward from each surface in the thickness direction.

In the case where the mid-thickness regions are defined as described above and where the foregoing relationship $XA-YA \geq 1.0$ of a preferred embodiment of the present invention is satisfied, it is possible to unfailingly provide a highly-durable multilayer ceramic capacitor that has a sufficient service life under high-temperature loading even if ceramic dielectric layers are made thinner.

It should be noted that, although the mid-thickness regions are specified as described above (i.e., regions each located 0.2 T or more inward from each surface in the thickness direction) in a preferred embodiment of the present invention, the mid-thickness regions may be wider regions. The reason is as follows. In a preferred embodiment of the present invention, although the percentage of Metal A in the near-surface regions of the inner electrodes is associated with an improvement in service life under high-temperature loading, the percentage of Metal A in inner regions of the inner electrodes (i.e., the regions located deeper than the near-surface regions) is not associated with an improvement in service life under high-temperature loading.

According to another preferred embodiment of the present invention, a method for producing the multilayer ceramic capacitor according to a preferred embodiment of the present invention is provided. The method includes: forming an unsintered ceramic multilayer body that includes (i) a stack of unsintered ceramic dielectric layers that will become the ceramic dielectric layers after sintering and (ii) unsintered inner electrode patterns that are disposed between the unsintered ceramic dielectric layers and that will become the inner electrodes after sintering, the unsintered inner electrode patterns being made from a conductive paste containing a Ni component and at least one metal, defined as Metal A, component selected from the group consisting of Fe, V, Y, and Cu components; obtaining the ceramic multilayer body by sintering the unsintered ceramic multilayer body; and annealing the ceramic multilayer body under specific conditions to thereby increase, in the inner electrodes, the percentage of Metal A in the near-surface regions each located at a depth of within 2 nm from the surface in contact with an adjacent one of the ceramic dielectric layers.

Other features, elements, characteristics, and advantages of the present invention will become more apparent from the following detailed description of preferred embodiments of the present invention with reference to the attached drawings.

DETAILED DESCRIPTION OF THE PREFERRED EMBODIMENTS

The following describes characteristics of the present invention in more detail on the basis of embodiments of the present invention.

Embodiment 1

<Structure of Multilayer Ceramic Capacitor>

Figure 1:
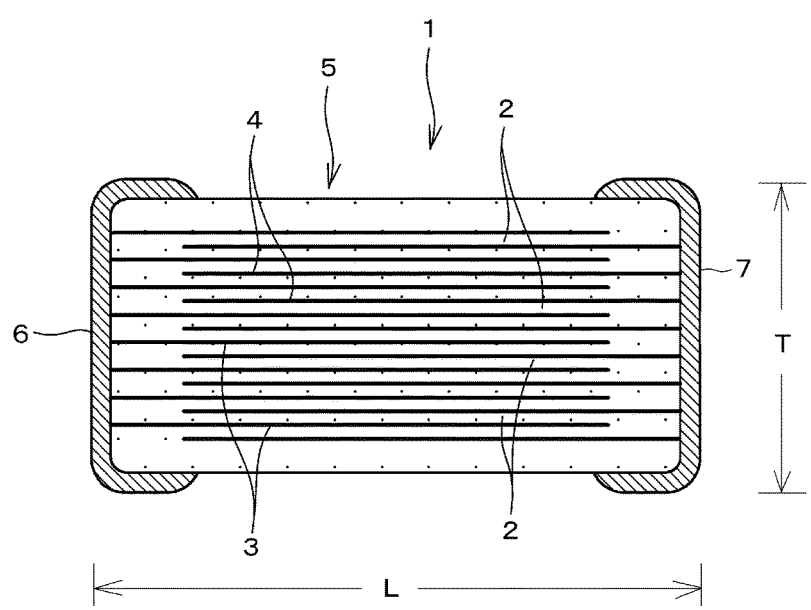
FIG. 1 is a front cross-sectional view showing a structure of a multilayer ceramic capacitor of an embodiment of the present invention.

FIG. 1 is a front cross-sectional view showing a structure of a multilayer ceramic capacitor of one embodiment (Embodiment 1) of the present invention.

The multilayer ceramic capacitor 1 includes a ceramic multilayer body 5. The ceramic multilayer body 5 includes a stack of ceramic dielectric layers 2 and inner electrodes 3 and 4 arranged in a superimposed manner with the ceramic dielectric layers 2 therebetween. It should be noted that one end of each inner electrode 3 is exposed on one end face of the ceramic multilayer body 5 and one end of each inner electrode 4 is exposed on the other end face of the ceramic multilayer body 5 in an alternating manner.

The opposite-end faces of the ceramic multilayer body 5 have thereon respectively outer electrodes 6 and 7, which are electrically connected to the inner electrodes 3 and 4, respectively.

The outer electrodes 6 and 7 are made from, for example, a conductive material such as that containing Ag or Cu as a main component.

It should be noted that, although the multilayer ceramic capacitor 1 of Embodiment 1 is of a two-terminal type which has two outer electrodes 6 and 7, the present invention is also applicable to a multilayer ceramic capacitor of a multi-terminal type which has multiple outer electrodes.

The inner electrodes 3 and 4 of the multilayer ceramic capacitor 1 contain an alloy (Ni-A alloy) as a main component. The Ni-A alloy is an alloy in which Metal A (element) selected from Fe, V, Y, and Cu is dissolved in Ni to form a solid solution.

Furthermore, in the inner electrodes 3 and 4, the percentage of Metal A with respect to the total amount of Ni and Metal A is 1.4 or more atom % in regions each located at a depth of within 2 nm from a surface in contact with an adjacent ceramic dielectric layer 2. Such regions are referred to as the near-surface regions. The atomic percentage XA of Metal A in these near-surface regions and the atomic percentage YA of Metal A in mid-thickness regions located in the middle in a thickness direction of the inner electrodes 3 and 4 (e.g., between the opposed near-surface regions of an inner electrode) satisfy the relationship XA−YA≥1.0.

This makes it possible to obtain a highly-reliable multilayer ceramic capacitor 1 which has an increased service life under high-temperature loading.

<Production of Multilayer Ceramic Capacitor>

The following is a description of a method for producing the multilayer ceramic capacitor 1 of one embodiment (Embodiment 1) of the present invention.

(1) First, specific amounts of $BaCo_3$ powder and $TiO_2$ powder (ingredients for a perovskite compound containing Ti and Ba) were weighed. Then, the powders were mixed together with a ball mill and thereafter treated with heat under specific conditions. In this way, barium titanate perovskite compound powder (a main component of the ceramic dielectric layers) was obtained.

(2) Next, $Dy_2O_3$ powder, MgO powder, MnO powder, and $SiO_2$ powder (secondary components) were prepared and weighed so that the amount of $Dy_2O_3$ was about 0.75 molar parts, the amount of MgO was about 1 molar part, the amount of MnO was about 0.2 molar parts, and the amount of $SiO_2$ was about 1 molar part with respect to 100 molar parts of the above-obtained main component. These powders were mixed with the barium titanate perovskite compound powder (main component) with the use of a ball mill for a specific period of time and dried, and thereafter dry-ground. In this way, base powder was obtained.

(3) Then, the base powder was mixed with a polyvinyl butyral binder and an organic solvent such as ethanol and wet-mixed with a ball mill, such that a slurry was prepared. The ceramic slurry thus obtained was formed into a sheet by a doctor blade method, such that a ceramic green sheet having a thickness of about 2.8 μm was obtained. It should be noted that this ceramic green sheet will become a ceramic dielectric layer after sintering.

(4) Next, a conductive paste for the inner electrodes was prepared in the following manner.

The following conductive powders were prepared: powders each containing an alloy of Ni and Metal A (at least one selected from Fe, V, Y, and Cu) (such powders are referred to as Ni-A alloy powders). In the present embodiment, each Ni-A alloy powder was prepared in advance so that the percentage of Metal A with respect to the total amount of Ni and Metal A was about 1 mass %, as shown in Table 1.

It should be noted that, instead of using the previously prepared Ni-A alloy powder, metal powders may be mixed in specific proportions before use so that a Ni-A alloy will form during heat treatment.

Then, each conductive powder was mixed with a polyvinyl butyral binder and an organic solvent such as ethanol and wet-mixed with a ball mill, such that a conductive paste was prepared.

(5) Next, the conductive paste was applied by printing on the above-described prepared ceramic green sheet so as to form a specific pattern, such that a conductive paste layer (inner electrode pattern) was formed. The inner electrode pattern will become an inner electrode after sintering.

(6) The ceramic green sheets having the inner electrode patterns thereon were stacked together to form a multilayer body in a manner such that the inner electrode patterns were alternately exposed on the opposite-end faces of the multilayer body. In this way, an unsintered ceramic multilayer body was obtained.

(7) Next, the unsintered ceramic multilayer body thus obtained was heated at about 350° C. in a $N_2$ atmosphere to thereby burn the binder and thereafter heated at a rate of about 20° C./min and sintered at about 1200° C. for about 20 minutes in a reducing atmosphere containing a $H_2$—$N_2$—$H_2O$ gas with an oxygen partial pressure of about $10^{-10}$ to $10^{-12}$ MPa.

(8) Then, the ceramic multilayer body was annealed in an atmosphere with an oxygen partial pressure of about $10^{-12}$ to $10^{-15}$ MPa at about 800 to 1000° C. for about 1 to 4 hours. It should be noted that, in the present embodiment, the amount of Metal A concentrated near the interfaces between the inner electrodes and the dielectric ceramic layers was controlled by controlling the annealing conditions.

Specifically, in a multilayer ceramic capacitor including the inner electrodes like those described in the present embodiment, a raise in annealing temperature causes an increase in the amount of Metal A in the near-surface regions of the inner electrodes.

(9) Next, a Ag paste containing a $B_2O_3$—$SiO_2$—BaO glass frit was applied to the opposite-end faces of the obtained ceramic multilayer body and baked in a $N_2$ atmosphere at about 600° C., such that the outer electrodes electrically connected to the inner electrodes were formed.

In this way, multilayer ceramic capacitors 1 (sample multilayer ceramic capacitors corresponding to sample numbers 1 to 13 in Table 1) having a structure like that shown in FIG. 1 were obtained.

The multilayer ceramic capacitors thus obtained had outside dimensions of about 1.2 mm in width, 2.0 mm in length, and 1.1 mm in thickness. The ceramic dielectric layers between the inner electrodes had a thickness of about 2.2 µm. The total number of effective ceramic dielectric layers was 300, and the area of overlap of inner electrodes was about $1.6 \times 10^{-6}$ $m^2$ per layer.

The sample multilayer ceramic capacitors corresponding to sample numbers 1, 4, 7, 10, and 13, marked with the "*" symbol in Table 1, are comparative examples which do not satisfy the requirements of the present invention, whereas the sample multilayer ceramic capacitors corresponding to sample numbers 2, 3, 5, 6, 8, 9, 11, and 12 with no "*" symbol are samples which do satisfy the requirements of the present invention.

It should be noted that the sample multilayer ceramic capacitor corresponding to sample number 1 in Table 1 is a sample in which the inner electrodes do not contain Metal A (at least one element selected from Fe, V, Y, and Cu), and the sample multilayer ceramic capacitors corresponding to sample numbers 4, 7, 10, and 13 are samples in which the percentage of Metal A in the near-surface regions of the inner electrodes is less than about 1.4 atom %. None of these samples satisfy the requirements of the present invention.

<Evaluation of Characteristics>

(1) MTTF (Mean Time to Failure)

Ten samples of each multilayer ceramic capacitor obtained above were prepared. Each sample was subjected to a high-temperature loading test at about 165° C. and about 7.5 V, and the time taken for insulation resistance to decrease to about 10 KΩ or lower was used as the time to failure. The MTTF was calculated from the obtained times to failure, and a comparison was made between sample numbers. The results are shown in Table 1.

(2) Confirming Presence of Metal a in Inner Electrodes

With respect to the prepared sample multilayer ceramic capacitors described above and shown in Table 1, the presence of Metal A in the inner electrodes was confirmed in the following manner.

(2-1) Polishing

Each sample multilayer ceramic capacitor was held so that the length (L) was parallel to the vertical direction. The sample multilayer ceramic capacitor was encapsulated in resin and a W-T face defined by the width (W) and the thickness (T) of the sample was exposed from the resin.

Then, the W-T face of the sample multilayer ceramic capacitor was polished with a polisher to about half the length (L). After polishing, the polished surface was subjected to ion milling to thereby remove the spread-out portions, which were spread out when polished, of the inner electrodes.

(2-2) Mapping Analysis of Inner Electrodes

Figure 2:
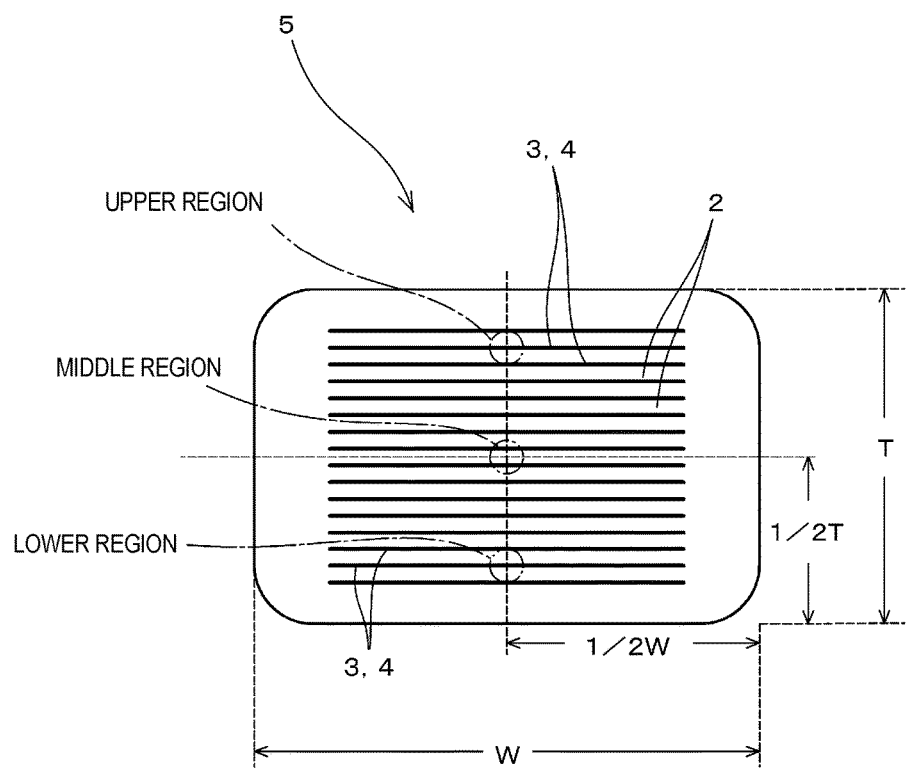
FIG. 2 describes the regions in which mapping analysis of Ni and Metal A was performed by WDX on inner electrodes of the multilayer ceramic capacitor of an embodiment of the present invention.

Next, the mapping analysis of Ni and Metal A was performed by wavelength-dispersive X-ray spectrometry (WDX). The analysis was performed in three regions, which contain a stack of inner electrodes, of the W-T cross section substantially in the middle in the length direction of the sample multilayer ceramic capacitor. The three regions are: a middle region substantially in the middle in the thickness (T) direction; and upper and lower regions near the top and bottom outermost layers (ineffective layers) (see FIG. 2).

The results are as follows. With regard to the sample multilayer ceramic capacitors in which the inner electrodes were formed from a conductive paste containing Metal A (sample numbers 2 to 13), the presence of Metal A in the inner electrodes was confirmed.

(3) Confirming Alloying of Metal A with Ni in Inner Electrodes

Each sintered multilayer ceramic capacitor (multilayer body) was pulverized to a powder. The powder was analyzed by XRD.

As a result, a shift of the Ni peak was observed. This demonstrates that Metal A in the inner electrodes has been alloyed with Ni.

(4) Checking Distribution of Metal A in Inner Electrodes (4-1) Preparation of Sample for Checking Distribution of Metal A At a W-T cross section substantially in the middle in the length direction of the sintered multilayer ceramic capacitor (multilayer body), a thin sample for analysis was cut out by FIB using a "micro-sampling" technique from a portion substantially in the middle in the width direction of the multilayer ceramic capacitor. The portion includes the following three regions containing a stack of inner electrodes: a middle region substantially in the middle in the thickness (T) direction; and upper and lower regions near the top and bottom outermost layers (ineffective layers).

It should be noted that the thickness of the thin sample was about 60 nm or smaller. The damage layer on the surface of the sample formed during FIB processing was removed by Ar ion milling.

In the preparation of the sample for analysis, the FIB processing was performed with the use of an SMI3050SE (available from Seiko Instruments Inc.), and Ar ion milling was performed with the use of a PIPS (available from Gatan).

(4-2) Analysis

Next, the above-described prepared sample was observed with a scanning transmission electron microscope (STEM) and four different inner electrodes were selected from each region of the sample.

Next, five positions at each of which the interface between a ceramic element and the inner electrode is substantially perpendicular to a cut surface (main surface) of the thin sample were selected from each of the four inner electrodes. Such an interface is hereinafter referred to as the substantially-perpendicular interface.

The inner electrode in contact with the substantially-perpendicular interface was subjected to the analysis. Specifically, a region located within 2 nm inward from the substantially-perpendicular interface in the direction perpendicular to the substantially-perpendicular interface (i.e., in the direction of the thickness of the inner electrode) and a region in the middle of the thickness of the inner electrode were subjected to the analysis. It should be noted that the region located within 2 nm inward from the interface is referred to as the "near-surface region" and the region in the middle of the thickness is referred to as the "mid-thickness region". The near-surface region and the mid-thickness region, which were subjected to the analysis, were included in the same inner electrode.

The substantially-perpendicular interface, which is substantially perpendicular to the cut surface of the thin sample, was selected in the following manner. First, lines (i.e., Fresnel fringes) which appear on both sides of each interface were observed by STEM. Then, the focus was changed while a search was made for an interface at which the contrast of the Fresnel fringes changes substantially symmetrically on both sides. The interface thus found was used as the interface substantially perpendicular to the cut surface of the thin sample.

The scanning transmission electron microscope used in the STEM analysis was a JEM-2200FS (available from JEOL). The accelerating voltage was about 200 kV.

The detector used in the STEM analysis was an SDD detector JED-2300T with a detection area of 60 mm$^2$. The EDX system was a Noran System 7 (available from Thermo Fisher Scientific K.K.).

Then, quantitative analysis of Ni and Metal A was performed with the use of an energy dispersive x-ray spectroscope (EDX). The analysis was performed on the near-surface region and the mid-thickness region at each of the five positions of each of the four inner electrodes in each of the three regions (i.e., the upper region, the middle region, and the lower region). That is, the analysis was performed at sixty positions in total. The diameter of the electron beam probe was about 1 nm and the measuring time was about 30 seconds. It should be noted that the quantitative correction of the obtained EDX spectrum was done by Cliff-Lorimer correction. The mapping time was about 3 hours.

Using the results of the quantitative analysis of Ni and Metal A at the foregoing sixty positions, the percentage (atomic percentage) XA of Metal A in the near-surface regions of the inner electrodes and the percentage (atomic percentage) YA of Metal A in the mid-thickness regions of the inner electrodes were determined. The results are also shown in Table 1.

Using the values of XA and YA thus determined, the difference between XA and YA (XA minus YA) was calculated. The results are also shown in Table 1.

TABLE 1

| sample number | type of Metal A | percentage of Metal A (mass %) | XA (atom %) | YA (atom %) | XA − YA | MTTF (hr) |
|---|---|---|---|---|---|---|
| 1* | — | — | — | — | — | 101 |
| 2 | Fe | 1 | 4.1 | 0.3 | 3.8 | 267 |
| 3 | Fe | 1 | 2.5 | 0.4 | 2.1 | 178 |
| 4* | Fe | 1 | 0.5 | 0.3 | 0.2 | 103 |
| 5 | V | 1 | 3.8 | 0.3 | 3.5 | 248 |
| 6 | V | 1 | 2.2 | 0.3 | 1.9 | 156 |
| 7* | V | 1 | 0.7 | 0.3 | 0.4 | 100 |
| 8 | Y | 1 | 3.2 | 0.4 | 2.8 | 233 |
| 9 | Y | 1 | 2.4 | 0.3 | 2.1 | 162 |
| 10* | Y | 1 | 0.6 | 0.3 | 0.3 | 99 |
| 11 | Cu | 1 | 2.8 | 0.4 | 2.4 | 215 |
| 12 | Cu | 1 | 1.4 | 0.4 | 1.0 | 141 |
| 13* | Cu | 1 | 0.4 | 0.3 | 0.1 | 102 |

As shown in Table 1, the sample multilayer ceramic capacitors corresponding to sample numbers 1, 4, 7, 10, and 13, which do not satisfy the requirements of the present invention (i.e., comparative examples), had poor results in MTTF and were found to be not reliable.

The sample multilayer ceramic capacitor corresponding to sample number 1, in which the inner electrodes do not contain Metal A (i.e., comparative example), had poor results in MTTF and was found to be not reliable.

In contrast, the multilayer ceramic capacitors corresponding to sample numbers 2, 3, 5, 6, 8, 9, 11, and 12, which satisfy the requirements of the present invention, had good results in MTTF and were found to be highly reliable. Specifically, the requirements of the present invention are as follows: at least one metal (Metal A) selected from the group consisting of Fe, V, Y, and Cu is dissolved in Ni to form a solid solution; the percentage of Metal A with respect to the total amount of Metal A and Ni is about 1.4 or more atom % in the near-surface regions of the inner electrodes each located at a depth of within 2 nm from the surface in contact with an adjacent ceramic dielectric layer; and the atomic percentage XA of Metal A in the near-surface regions and the atomic percentage YA of Metal A in mid-thickness regions each located in the middle in the thickness direction of the inner electrode satisfy the relationship XA−YA≥1.0.

This seems to have occurred because the alloying of Ni and Metal A in the near-surface regions of the inner electrodes caused a change in state of the interfaces between the ceramic dielectric layers and the inner electrodes.

It should be noted that the surfaces of the inner electrodes which are in contact with the ceramic dielectric layers may have thereon elements (other than Ni and Metal A) which are contained in the ceramic dielectric layers or the inner electrodes.

Further note that the interfaces between the ceramic dielectric layers and the inner electrodes may partially have a heterogeneous phase constituted by elements other than Ni and Metal A.

Furthermore, the inner electrodes may contain a ceramic material having the characteristics similar to those of the ceramic material constituting the ceramic dielectric layers (such a material is referred to as a co-material). Specific examples of the co-material include: ceramic materials having the same composition as the ceramic material constituting the ceramic dielectric layers; ceramic materials not containing some constituent elements of the ceramic material of the ceramic dielectric layers; ceramic materials containing the same constituent elements as the ceramic material of the ceramic dielectric layers except for some of them; and ceramic materials containing the same constituent elements as the ceramic material of the ceramic dielectric layers but in different proportions.

As has been described, a multilayer ceramic capacitor of a preferred embodiment of the present invention is configured such that, in the inner electrodes, at least one metal (element), defined as Metal A, selected from the group consisting of Fe, V, Y and Cu is dissolved in Ni to form a solid solution, the percentage of Metal A with respect to the total amount of Metal A and Ni is 1.4 or more atom % in near-surface regions each located at a depth of within 2 nm from a surface in contact with an adjacent ceramic dielectric layer, and the relationship described below is satisfied:

$$XA-YA \geq 1.0$$

where XA represents the atomic percentage of Metal A in the near-surface regions and YA represents the atomic percentage of Metal A in mid-thickness regions of the inner electrodes. Accordingly, it is possible to provide a highly-durable multilayer ceramic capacitor that has a sufficient service life under high-temperature loading even if ceramic dielectric layers are made thinner.

It should be noted that XA and YA, each of which represents the "atomic percentage of Metal A", expresses the number of Metal (element) A atoms in percentage with respect to the total number of Metal A atoms and Ni atoms.

Specifically, XA and YA are each calculated using the following equation:

$XA$ or $YA = \{\text{number of Metal } A \text{ atoms}/(\text{number of Metal } A \text{ atoms} + \text{number of Ni atoms})\} \times 100.$ It should be noted that, in the case where the percentage of Metal A and the percentage of Ni are given in mass percentage, the atomic percentage of Metal A can be calculated by dividing each amount in mass percentage by atomic weight to find the values of (mass percentage of Ni/atomic weight of Ni) and (mass percentage of Metal A/atomic weight of Metal A) and thereby finding the atomic percentage of Metal A.

More specifically, the multilayer ceramic capacitor of a preferred embodiment of the present invention has the following features:

(a) in the inner electrodes, at least one metal (defined as Metal A) selected from the group consisting of Fe, V, Y, and Cu is dissolved to form a solid solution, (b) the inner electrodes are made from an alloy of Ni and Metal A (at least one selected from the group consisting of Fe, V, Y, and Cu), and (c) the near-surface regions (the regions each located at a depth of within 2 nm from the surface in contact with a ceramic dielectric layer) of the inner electrodes contain a specific percentage (concentration) or more of Metal A (at least one selected from the group consisting of Fe, V, Y, and Cu) at a higher concentration than the mid-thickness regions (hereinafter may be referred to as the "inner regions").

In the multilayer ceramic capacitor of a preferred embodiment of the present invention having the above features, the inner electrodes are made from an alloy such as Ni—Fe, Ni—V, Ni—Y, or Ni—Cu, and the near-surface regions contain a higher percentage of the alloy than the other regions. This causes a change in state (height of electric barrier) of regions near the interfaces between the inner electrodes and the ceramic dielectric layers and contributes to an improvement in service life under high-temperature loading.

That is, a high percentage of an alloy such as Ni—Fe, Ni—V, Ni—Y, or Ni—Cu present particularly in the near-surface regions of the inner electrodes plays an important role in improving service life under high-temperature loading.

On the other hand, the inner regions (regions deeper than the near-surface regions) of the inner electrodes are not associated with an improvement in service life under high-temperature loading and thus do not necessarily have to contain an alloy such as Ni—Fe, Ni—V, Ni—Y, or Ni—Cu.

The foregoing features (a) and (b) (i.e., in the inner electrodes, Fe, V, Y, and/or Cu is dissolved to form a solid solution and the inner electrodes are made from an alloy such as Ni—Fe, Ni—V, Ni—Y, or Ni—Cu) can be verified by X-ray diffractometry (XRD) and wavelength dispersive X-ray analysis (WDX).

Furthermore, the foregoing feature (c) (i.e., the near-surface regions of the inner electrodes contain a specific percentage (concentration) or more of Metal A (at least one selected from Fe, V, Y, and Cu) at a higher concentration than the inner regions (mid-thickness regions) of the inner electrodes) can be verified by energy dispersive x-ray spectrometry (TEM-EDX).

Furthermore, a method for producing a multilayer ceramic capacitor of another preferred embodiment of the present invention includes, as described earlier, annealing the sintered ceramic multilayer body under specific conditions to thereby increase, in the inner electrodes, the percentage of Metal A in the near-surface regions each located at a depth of within 2 nm from the surface in contact with an adjacent ceramic dielectric layer. This makes it possible to unfailingly and effectively produce a multilayer ceramic capacitor of a preferred embodiment of the present invention having the foregoing features.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A multilayer ceramic capacitor comprising:
   a ceramic multilayer body including a stack of a plurality of ceramic dielectric layers and a plurality of inner electrodes arranged opposing each other with a respective ceramic dielectric layer of the plurality of ceramic dielectric layers interposed therebetween; and
   outer electrodes disposed on an outer surface of the ceramic multilayer body, each outer electrode being in electrical connection with a respective set of inner electrode of the plurality inner electrodes,
   the inner electrodes including a Ni-Metal A alloy, wherein Metal A is at least one metal selected from the group consisting of Fe, V, Y, and Cu,
   a percentage of Metal A with respect to a total amount of Metal A and Ni in near-surface regions of the plurality of inner electrodes is 1.4 or more atom %, each of the near-surface regions being a region at a depth of within 2 nm from a surface in contact with an adjacent one of the respective ceramic dielectric layers, and $XA - YA \geq 1.0$ where XA represents an atomic percentage of Metal A in the near-surface regions and YA represents an atomic percentage of Metal A in mid-thickness regions of the plurality of inner electrodes.

2. The multilayer ceramic capacitor according to claim 1, wherein the plurality of inner electrodes have a thickness defined as T, and each of the mid-thickness regions is located 0.2T or more inward from each surface of the plurality of inner electrodes in a thickness direction thereof.

3. The multilayer ceramic capacitor according to claim 1, wherein the Ni-Metal A alloy contains a solid solution of Ni and the Metal A.

4. The multilayer ceramic capacitor according to claim 1, wherein the plurality of inner electrodes contain a co-material.

5. The multilayer ceramic capacitor according to claim 4, wherein the co-material contains at least some constituent elements of a ceramic material of the ceramic dielectric layers.

* * * * *